Oct. 21, 1952 — R. S. GRANT — 2,614,787
UNIVERSAL WEIGHER AND BAGGER
Filed Aug. 19, 1947 — 3 Sheets-Sheet 1

ROBERT S. GRANT
INVENTOR.

BY
ATTORNEY.

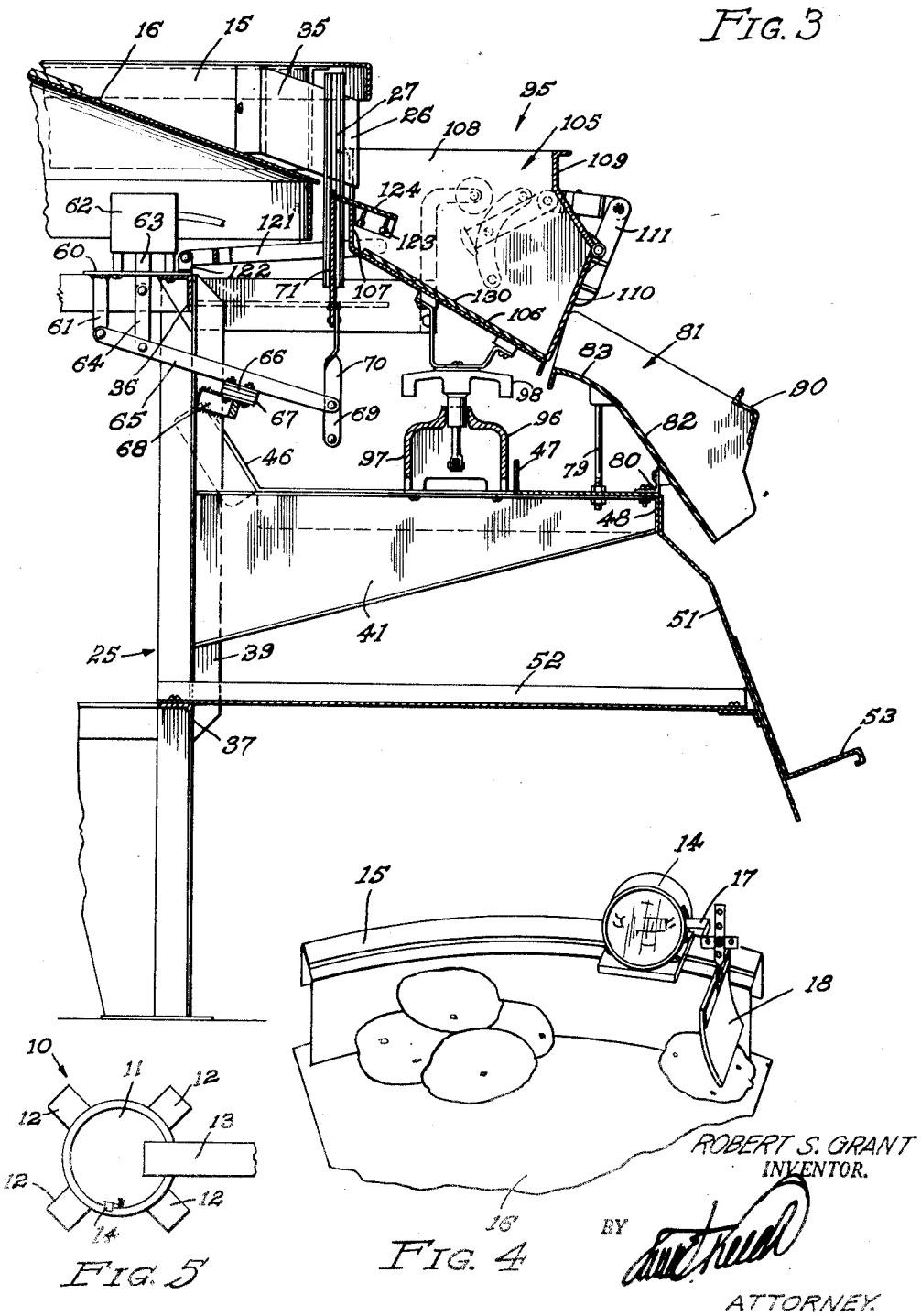

Oct. 21, 1952 — R. S. GRANT — 2,614,787
UNIVERSAL WEIGHER AND BAGGER
Filed Aug. 19, 1947 — 3 Sheets-Sheet 3
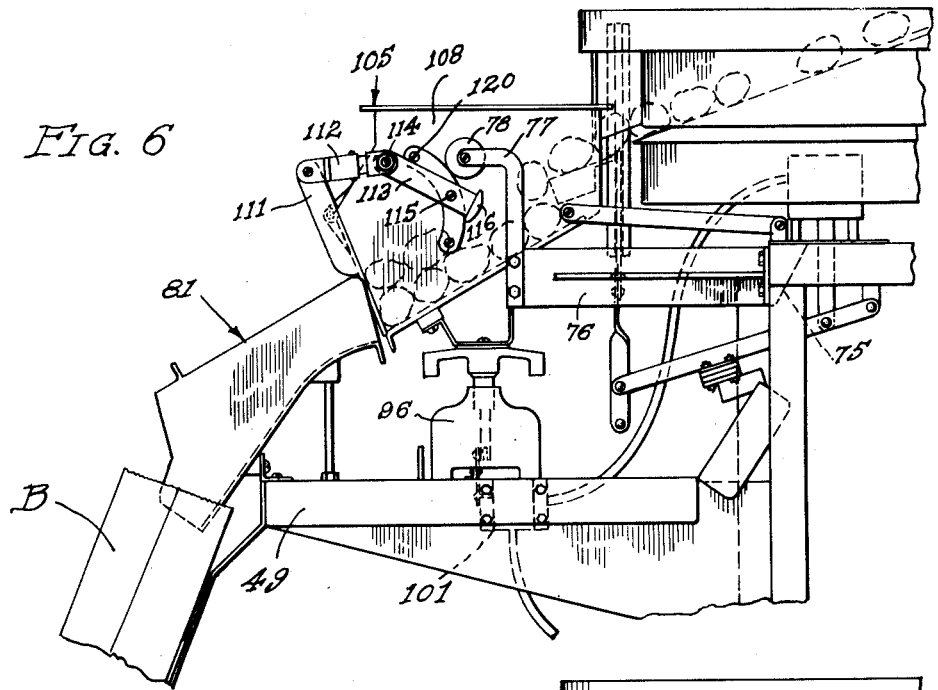
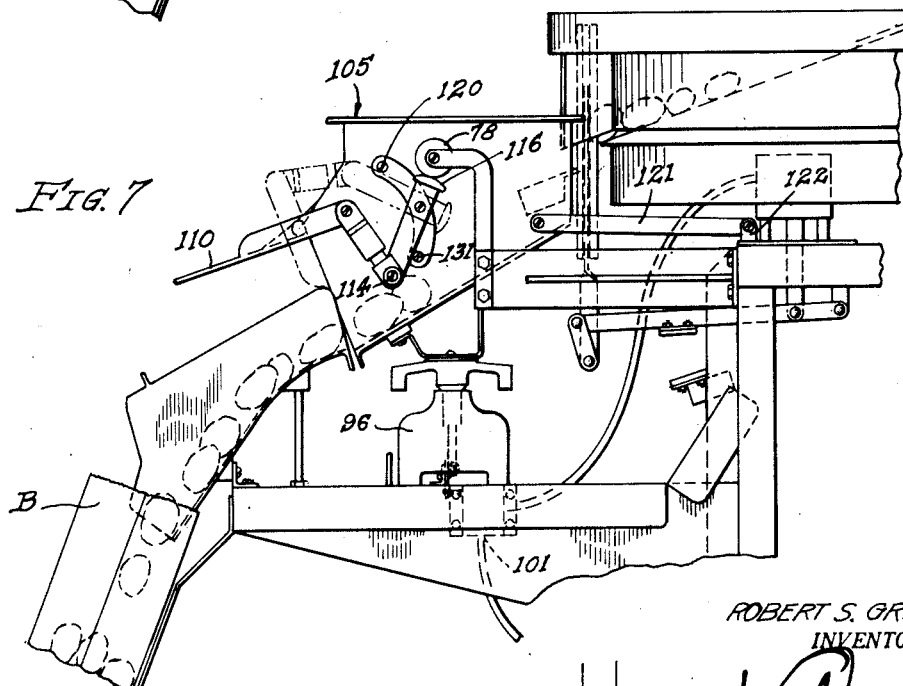
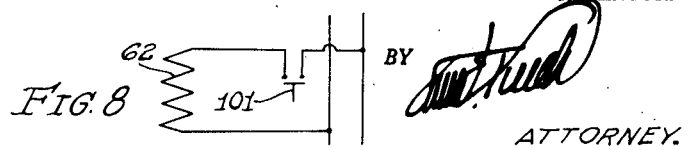
ROBERT S. GRANT
INVENTOR.
BY
ATTORNEY.

Patented Oct. 21, 1952

2,614,787

UNITED STATES PATENT OFFICE 2,614,787

UNIVERSAL WEIGHER AND BAGGER

Robert S. Grant, Lakeland, Fla., assignor to Food Machinery and Chemical Corporation, a corporation of Delaware Application August 19, 1947, Serial No. 769,370

5 Claims. (Cl. 249—53)

1

This invention relates to equipment for facilitating the filling of bags with weighed quantities of loose material and is particularly useful in bagging loose fruits and vegetables such as apples, plums, pears, citrus fruits, potatoes, onions, etc.

It is an object of the invention to provide an improved weigher and bagger of large capacity and by which loose products may be economically bagged in bags of various sizes and materials and in the operation of which the quantity of product to be delivered to each bag may be adjustably predetermined.

It is another object of the invention to provide such a weigher and bagger having a novel means for preventing the delivery of product to the scale hopper after the latter has received the weighed load of said product for which it has been set and until said load has been delivered to a bag and the scale hopper is empty and closed, ready for receiving another such load.

Yet another object of the invention is to provide a novel non-bridging chute for transferring product discharged from the scale hopper into the bag.

The manner of accomplishing the foregoing objects as well as further objects and advantages will be made manifest in the following description taken in connection with the accompanying drawings in which:

Fig. 3 is a vertical sectional view taken on the line 3—3 of Fig. 1.

Fig. 4 is a fragmentary perspective view of a feed control device of the invention.

Fig. 5 is a miniature plan view of the entire weigher and bagger of the invention.

Fig. 6 is a side elevational view of Fig. 1 taken in the direction of the arrow 6 and illustrating the delivery of a load of loose product to the scale hopper of the invention.

Fig. 7 is a view similar to Fig. 6 illustrating the manner in which the discharge gate of the scale hopper is manually operated to deliver a load from said hopper into a bag.

Fig. 8 is a wiring diagram of the electrical circuit of one of the solenoids of the invention.

Figure 1:
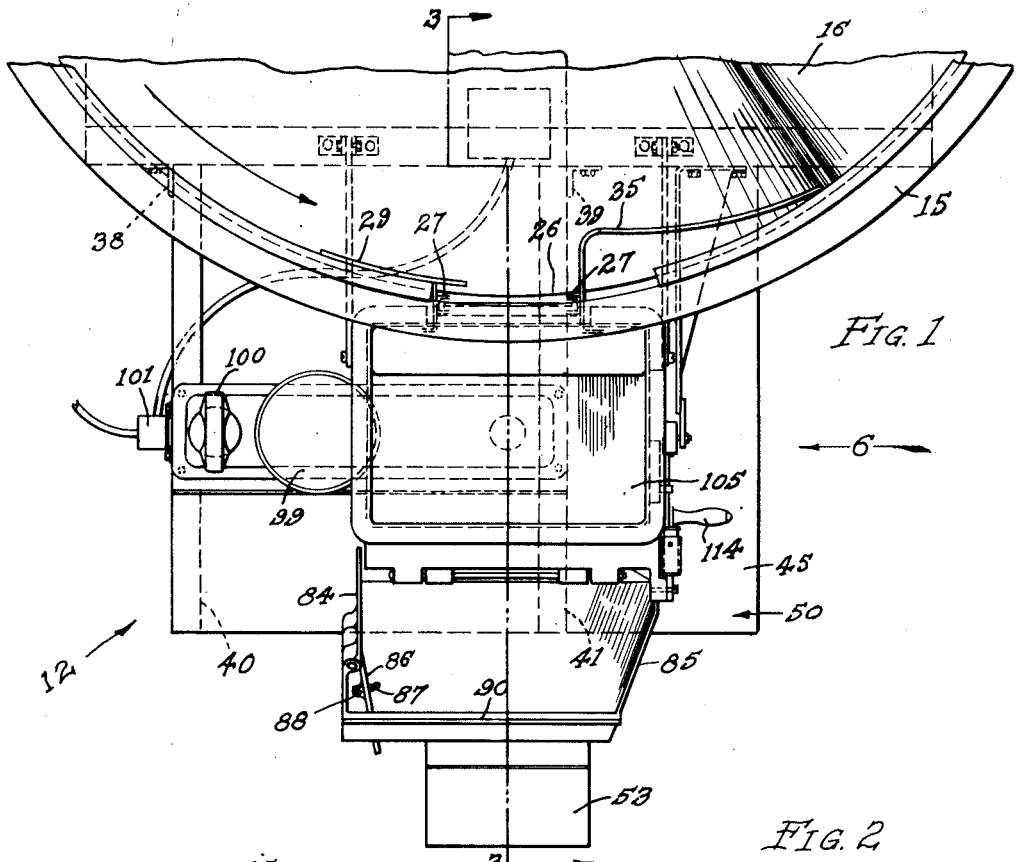
Fig. 1 is a plan view of a preferred embodiment of a weigher and bagger unit of this invention with the scales hopper closed in readiness for receiving a load of product.

Referring specifically to the drawings and particularly to the plan view of Fig. 5, the invention is shown as embodied in a weigher and bagger 10 including a feeder 11 about which are grouped a series of four weighing and bagging units 12.

2

The feeder 11 receives loose product from an elevator 13 and in turn, delivers this to the units 12.

The elevator 13 is preferably electrically driven and this elevator is controlled by a mercury switch 14, mounted on an annular wall 15 which surrounds a conical rotary deck 16 of the feeder 11.

The switch 14 has a switch arm 17 on which a product contact member 18 is secured so as to be vertically adjustable on the arm 17 to present the member 18 to the product at a predetermined level above the deck 16.

The elevator 13 may thus be set to feed loose product onto the deck 16 at a speed in excess of that necessary to keep a supply of product on the deck 16 for use by the weigher and bagger 10.

The switch 14 is preferably connected with the electrical circuit of the elevator 13 to shut off the latter when product has accumulated on the deck 16 to a certain height where it engages and lifts the switch member 18.

Figure 2:
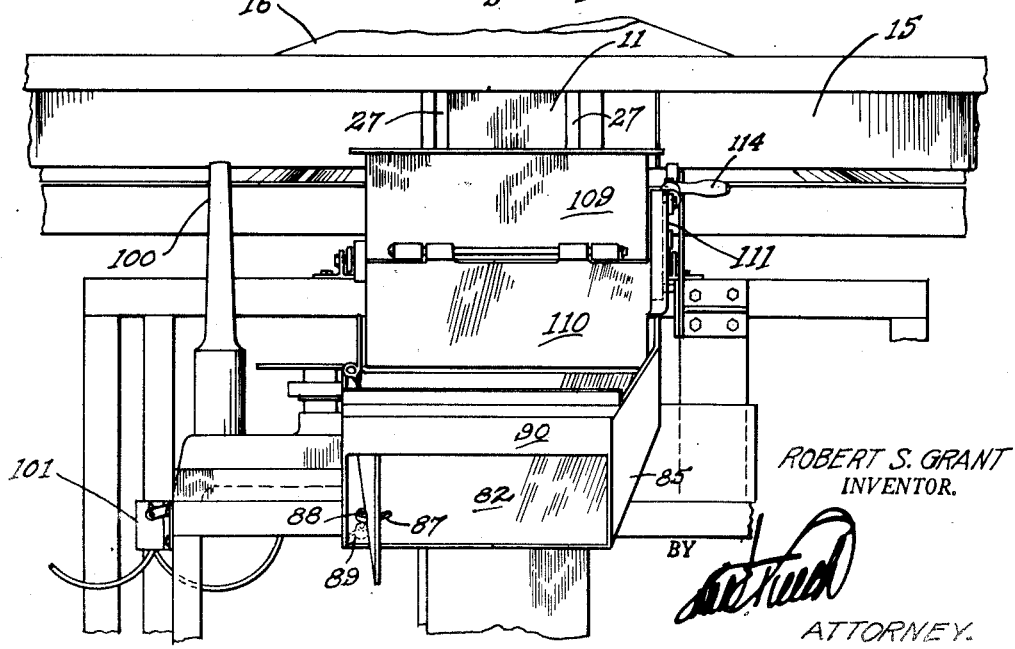
Fig. 2 is a front elevational view of Fig. 1.

Referring now to Figs. 1, 2 and 3, it is noted that the weigher and bagger 10 is supported on a frame 25 on which the annular wall 15 is rigidly fixed and which also supports the means (not shown) for mounting and rotating the deck 16 about a vertical axis.

Opposite each of the units 12, the annular wall 15 is provided with a feed port 26 through which loose product is fed to said unit by the feeder 11. Opposite sides of the port are vertical and are provided with guide channels 27, the purpose of which will be made clear hereinafter.

Mounted on the wall 15 to one side of each of the ports 26 (in the direction from which loose product travels toward said port on the deck 16) and horizontally slidable on said wall so that it may be slid into covering relation with said port or away from such covering relation at will, is a port cover plate 29.

On the opposite side of each port 26 is fixed a baffle 35 which extends inwardly a short distance over the deck 16 and then is bent outward into contact with the wall 15 as shown in Fig. 1. The purpose of the baffle 35 is to interrupt the travel of loose product circumferentially on the deck 16 and divert this through the port 26 to the adjacent weighing and bagging unit 12.

The units 12 are identical and a description of the one shown in Figs. 1, 2, 3, 6 and 7 will suffice for all.

This unit is mounted on the frame 25 and particularly on a pair of horizontal angle irons 36 and 37 thereof. Secured to the angle irons 36 and 37 are vertical angle irons 38 and 39 on which are welded cantilever arms 40 and 41. Welded to the arms 40 and 41 is a horizontal L-shaped sheet of metal 45 which has bent-up edge flanges 46 and 47 and bent-down edge flanges 48 and 49 to form a rigid table 50 for holding paper bags, scale weights and other accessories to the operation of the unit 12.

Welded at its upper end to the flange 48, and extending steeply downwardly and outwardly in symmetrical relation with the radial axis of the feed port 26, is a bag support base 51, this base is braced by a light channel member 52 which connects the base 51 with the frame channel iron 37. Mounted on the base 51 and adjustable vertically thereon, is a bag support rest 53.

Welded on the channel iron 36 (see Fig. 3) is a horizontal plate 60 having a downwardly extending post 61. Supported on the plate 60 is a solenoid 62, the armature 63 of which extends downwardly through a suitable aperture in the plate 60 and is connected by a link 64 to a lever 65 which pivotally fulcrums on the post 61.

The lever 65 has a rubber cushion 66 which is adapted to come to rest on a similar cushion 67 provided on a bracket 68 which is welded to the vertical angle iron 39. The free or working end of the lever 65 is connected through links 69 to the lower end of a bar 70, the latter extending downwardly from a fruit feeding door 71 which is slideably disposed in the guide channels 27.

When the solenoid 62 is de-energized, as shown in Fig. 3, the upper edge of the door 71 lies just below the adjacent outer edge of the conical rotary feeder deck 16. When the solenoid 62 is energized, however as shown in Fig. 7, the door 71 is lifted to close the port 26. With the de-energizing of the solenoid 62, the door 71 drops by gravity to its lowermost position thereby reopening the feed port 26.

The angle iron 36 is provided with a reinforcement 75 which is welded thereto to form a base for rigidly securing to this angle iron, a horizontally extending bracket 76 having an arm 77 rising therefrom and bent forwardly to pivotally support a roller 78 in a fixed position.

Adjustably supported on the table 50, on a leg 79, and a clip 80 is a transfer chute 81 having a steeply inclined bottom 82 which, at the upper receiving end of the chute, includes a curved portion 83 of considerably reduced slope.

The chute 81 has converging side walls 84 and 85, the wall 84 having an inner side wall 86 pivoted thereto and held in adjustable position relative to the wall 85 to adapt the chute 81 to fit into bags of various sizes, by a screw 88 on the wall portion 86, extending downwardly through a slot 87 in the chute bottom 82 and provided with a wing-nut 89 therebeneath.

The side wall 85 and the stationary portion of the side wall 84 are connected together by a cross-member 90.

Interposed between the feeder 11 and the chute 81 is a weigher 95. This includes a standard scales 96 having a base 97 which rests upon and is secured to the cantilever arms 40 and 41. The scales provides a weighing platform 98, a counterbalance platform 99, a visual indicator housing 100, and an electric switch 101 which is actuated when a predetermined weight is supported on the platform 98.

Mounted on the scales platform 98 is a weighing hopper 105 including an inclined bottom 106, a short back wall 107, side walls 108, and a front wall 109, the latter having a discharge opening adjacent the lower end of the floor 106 which is controlled by a gate 110 pivoted on the wall 109.

This gate has an arm 111 which connects pivotedly with an extensible link 112 which, in turn, is pivoted to a cam lever 113 by a handle 114. The lever 113 is pivoted at 115 on the adjacent side wall 108 of the hopper 105 and has a cam 116 on its free end.

The link 112 contains a spring which expands this link when the handle 114 is swung upwardly to close the gate to bring the lever 113 against a stop 120 without completely expanding the link 112. The spring in the link 112 thus holds the gate 110 in closed position when the handle is released by the operator.

The gate 110 is adapted to be opened by the operator seizing and depressing the handle 114 to the position in which it is shown in Fig. 7. When this is done, the cam 116 engages the roller 78 which, as before mentioned, is supported on the arm 77 in a rigidly fixed position. This contact shifts the hopper 105 downwardly into its lowermost position or holds it in this position if it is already there.

The hopper 105 is steadied in its vertical movement during the operation of the scales 96 by a pair of arms 121 which are pivoted to the sides of the hopper, the opposite ends of these arms pivoting on studs 122 fixed on the angle iron 36.

Fixed at its opposite ends by screws 123 to side walls 108 of the hopper 105 so as to be adjustable up and down thereon, is a shelf 124 which overlies the short wall 107 of the hopper 105, extends close to the feed door 71 and lies just below the upper edge of the latter when this is in its lowered position as shown in Fig. 3. The shelf 124 is preferably angled so as to be substantially parallel with the slope of the feeder deck 16.

Operation

As already noted, the weigher and bagger 10 may be employed to weight and bag any of a wide variety of loose products. To illustrate its operation on one of these, however, it has been shown in Figs. 6 and 7 in the process of weighing and bagging loose potatoes.

Before starting to operate the machine, the contact member 18 is adjusted on the switch arm 17 so as to be missed by potatoes carried on the deck 16 when these are only one layer deep. It is set at a level close above a single layer of potatoes, however, so that whenever enough potatoes are fed to the feeder 11 as to form a double layer of potatoes, the upper of these layers will contact the member 18 to shut off the elevator 13.

As the potatoes on the deck 16 are fed to the various weighing and bagging units 12, the potatoes remaining on the deck 16 will soon form only a single layer whereupon the member 18 will drop downward and actuate the switch 14 to start the elevator 13 again. Thus it is only necessary to feed the potatoes to the elevator 13 at such a rate that when the latter is running, potatoes will be delivered onto the feeder 11 slightly in excess of the rate at which they are delivered from the feeder to the units 12 in order to keep the feeder well supplied with potatoes.

The switch 14, of course, assures that the feeder will never be over-loaded.

In operating the apparatus 10, an attendant is needed for each of the weighing and bagging units 12 (these usually being women) and another attendant (a man) is required for feeding potatoes to the elevator 13.

The latter may be connected in line with suitable apparatus for grading and sizing product so that only a certain grade and size of the product is delivered on the elevator 13 to the feeder 11. The various units 12 may be set for filling various bags of different sizes with differing quantities of product or all may be set to fill the same size bags with the same amount of product.

The scales 96 of each unit is tared so as to be in balance at zero when the hopper 105 is empty with the gate 110 thereof closed.

Before starting, the counter-weight platform 99 of each unit must have placed thereon counter-weights corresponding to the weight of load which is desired to be delivered from that unit to a bag with each cycle of operation.

The chute 81, as illustrated in the drawings, is especially adapted for use in delivering loose product to paper bags. It is to be understood that various bag holders suitable for supporting net bags may be associated with this chute for the filling of this type of container.

One of the purposes of the table 59 of each unit is the holding of a supply of folded paper bags (which is usually placed on the right-hand side thereof).

The pivoted side chute wall 86 is, of course, adjusted and the screw 88 set to hold it in place so that the particular paper bag to be filled will just fit snugly over the discharge end of the chute 81.

The rest 53 is also adjustably fixed on the support base 51 at the proper height to support the bottom of the bag when the upper end of the bag receives the lower end of chute 81.

With particular reference to Fig. 8, it will be seen that the switch 101 of each unit is in the circuit of the solenoid 62. When the switch 101 is closed this solenoid is energized and when the switch is open this solenoid is de-energized.

After the provisions and adjustments above described have been made, the apparatus 10 is in readiness to function.

Assuming all four units 12 are to be used in the operation of the apparatus 10, all of the ports 26 are uncovered by the port covering plates 29 being slid in a clockwise direction on the wall 15 away from covered relation with the ports 26. The gates 110 are also all closed by the handles 114 being swung upwardly in the position in which one of these is shown in Fig. 6.

Continual rotation of the feeder deck 16, sloping as it does at a fairly steep angle towards the wall 15, causes the potatoes on this deck to be fed through each of the ports 26 into the hopper 105 disposed therebelow.

Each of these potatoes is momentarily supported on and rolls over the shelf 124 and then gravitates into the hopper 105. The floor 106 of the hopper 105 is preferably provided with a resilient cushion 130 to prevent bruising of the product as it falls into the hopper. This feeding of potatoes into each hopper 105 continues until the final increment, or last potato necessary to add to those already fed into that hopper in order to make up the load which the scales 96 supporting it have been set to weigh, is delivered through the port 26 onto the shelf 124.

Immediately upon this potato arriving on the shelf 124 this hopper 105 descends a sufficient distance to actuate the switch 101 and energize the solenoid 62 to shut the feed door 71 by sliding this rapidly upward in the guide channels 27.

The attendant for this particular unit then glances at the visual hand which may be seen through a window provided in the housing 100 to determine whether the weight of the load delivered to the hopper 105 is excessive or whether it is within the tolerance permitted. If it is excessive, adjustment is made by her picking out a potato from the feeder 11 of less size than one of the potatoes in the hopper 105, exchanging the one picked out for the one previously in the hopper while she holds the hopper downwardly with her hand. When she releases the hopper after making this change she again observes the visual indicator to note from the swinging of this whether or not the weight of this load has been brought within the allowed tolerance. If it has not, she makes another similar exchange and keeps this up until the load comes within the tolerance. The attendants become expert so that seldom is more than one such exchange necessary to adjust the load to the allowed tolerance.

This adjustment accomplished, nothing more remains to be done but to hold up the bag with one hand about the lower end of the chute 81 and, with the other, depress the handle 114 (as shown in Fig. 7) so as to bring the lever 113 against a stop 131.

This opens wide the gate 110 allowing the load of potatoes weighed in the hopper 105 to gravitate rapidly from the hopper and over the chute 81 into the bag B.

As before pointed out, cam 116 is rocked opposite the roller 78 at this time and this retains the hopper 105 in its downward position in which the scales are caused to close the switch 101 to keep the solenoid 62 energized, thereby holding the feed door 71 up in closed position. Thus no potatoes may be fed into the hopper 105 while a load is being discharged from this into a bag and the feeding of potatoes to the hopper is not resumed until the gate 110 of that hopper 105 is closed as shown in Fig. 6; in other words, until it is returned to the position where it was when the first weighing operation started.

The upward swinging of the handle 114 brings the lever 113 against the stop 120 and shifts the cam 116 out of contact with the roller 78. This permits the empty hopper 105 to be elevated by the springs in the scales 96 with the result that switch 101 opens de-energizing the solenoid 62 and thus opening the port 26 to cause a resumption of feeding of potatoes into the hopper 105.

Thus the completion of each weighing and bagging cycle automatically starts another.

It is desired to point out that the curved upper portion of the steeply inclined bottom 82 of the chute 81 performs the important function of preventing the bridging of a load of product as this floods through the open gate of the hopper 105 when the latter is swung wide open.

It also tends to retard the speed of flow of the mass as it moves down the chute and prevent this from scattering thereby resulting in an orderly and uniform delivery of the load into the bag.

It is also to be noted that the provision of the shelf 124 close to the feed port 26, and just below the upper edge of the feed door 71 in its lowermost position, causes the last potato delivered through the port 26, which is necessary for making up a load of desired weight in the hopper 105, to depress the hopper by engagement with the shelf 124 with sufficient rapidity to cause the door 71 to shut before additional potatoes are fed into the hopper. This greatly increases the accuracy with which loose products may be weighed and bagged.

The claims are:

1. In combination: a scales, having a weighing hopper and a manually controlled bottom gate; means forming a port through which units of product are fed into said hopper; a door for closing said port; means responsive to the lowering of said hopper, by the delivery thereto of a given weight of product, to shift said door to port closing position and hold said door in said position so long as said hopper is lowered as aforesaid; and means actuated by the opening of said bottom gate to lock said hopper in its lowered position aforesaid, said means releasing said hopper upon the closing of said gate.

2. A combination as in claim 1 including linkage provided on said hopper for controlling the opening and closing of said gate and the locking of said hopper as aforesaid; and a handle on said linkage for normally actuating said linkage to open said gate and lock said hopper by a downward thrust against said handle, and to close said gate and unlock said hopper by an upward thrust against said handle the actuation of said linkage thereby holding said hopper down while the gate is being opened and tending to lift said hopper to initiate a new weighing cycle while the gate is being closed.

3. In combination, a receptacle, an inclined shelf adjustably mounted adjacent the upper portion of said receptacle, means for adjusting said shelf to vary the angle of inclination thereof, means for feeding loose product over said shelf into said receptacle; and means responsive to a given weight of said product in said receptacle and on said shelf for preventing further feeding of said product.

4. In combination; a scales, having a weighing hopper with an inclined bottom; means including an inclined surface for feeding loose product into said hopper adjacent the high side of said bottom; a shelf provided on said hopper at a high point therein and positioned to be engaged by units of said product as the latter are delivered successively into said hopper, means for adjusting the angle of said shelf relative to said inclined feed surface; means responsive to a given weight of product being delivered to said hopper to shut off the delivery of said product to said hopper; and gate means adjacent the lower end of said hopper floor for discharging a load of said product thus delivered to said hopper.

5. In combination; a scales, having a weighing hopper with an inclined bottom; means including an inclined surface for feeding loose product into said hopper adjacent the high side of said bottom; a shelf provided on said hopper at a high point therein and positioned to be engaged by units of said product as the latter are delivered successively into said hopper; means for adjusting the vertical location of said shelf relative to said inclined feed surface; means responsive to a given weight of product being delivered to said hopper to shut off the delivery of said product to said hopper; and gate means adjacent the lower end of said hopper floor for discharging a load of said product thus delivered to said hopper.

ROBERT S. GRANT.

REFERENCES CITED

The following references are of record in the file of this patent:

UNITED STATES PATENTS

| Number | Name | Date |
| --- | --- | --- |
| 193,768 | Martin | July 31, 1877 |
| 315,730 | Clawson | Apr. 14, 1885 |
| 568,584 | Richards | Sept. 29, 1896 |
| 694,222 | Wertenbruch | Feb. 25, 1902 |
| 717,426 | MacDonald | Dec. 30, 1902 |
| 1,248,473 | Freeland | Dec. 4, 1917 |
| 1,278,097 | Blake | Sept. 10, 1918 |
| 1,602,578 | Ingram | Oct. 12, 1926 |
| 2,228,595 | Finch | Jan. 14, 1941 |
| 2,234,951 | Belcher | Mar. 18, 1941 |